(12) United States Patent
Monden et al.

(10) Patent No.: US 8,455,097 B2
(45) Date of Patent: Jun. 4, 2013

(54) COATING LIQUID FOR COVERING GLASS FIBER AND RUBBER-REINFORCING GLASS FIBER USING SAME

(75) Inventors: Toshiya Monden, Mie (JP); Hiroyuki Hyakutake, Mie (JP); Katsuhiko Ogaki, Mie (JP)

(73) Assignee: Central Glass Company, Limited, Ube-shi (JP)

( * ) Notice: Subject to any disclaimer, the term of this patent is extended or adjusted under 35 U.S.C. 154(b) by 1090 days.

(21) Appl. No.: 11/664,114

(22) PCT Filed: Sep. 27, 2005

(86) PCT No.: PCT/JP2005/017725
§ 371 (c)(1),
(2), (4) Date: Mar. 30, 2007

(87) PCT Pub. No.: WO2006/038490
PCT Pub. Date: Apr. 13, 2006

(65) Prior Publication Data
US 2008/0280715 A1   Nov. 13, 2008

(30) Foreign Application Priority Data

| Oct. 1, 2004 | (JP) | 2004-290183 |
|---|---|---|
| Sep. 2, 2005 | (JP) | 2005-254242 |
| Sep. 2, 2005 | (JP) | 2005-254243 |
| Sep. 2, 2005 | (JP) | 2005-254244 |
| Sep. 2, 2005 | (JP) | 2005-254245 |

(51) Int. Cl.
*B32B 9/00* (2006.01)

(52) U.S. Cl.
USPC ........ 428/392; 428/375; 428/394; 428/295.1; 428/296.1; 474/260; 474/261; 474/264; 152/451

(58) Field of Classification Search
None
See application file for complete search history.

(56) References Cited

U.S. PATENT DOCUMENTS

| 3,410,818 | A | * | 11/1968 | Yurcick et al. | 524/510 |
|---|---|---|---|---|---|
| 3,660,202 | A | * | 5/1972 | Edington et al. | 156/335 |
| 3,843,484 | A | * | 10/1974 | Kamiyoshi et al. | 156/335 |
| 3,843,575 | A | * | 10/1974 | Dijkstra | 524/841 |
| 4,366,303 | A | * | 12/1982 | Kopf | 528/129 |
| 4,636,550 | A | * | 1/1987 | Wolff et al. | 524/552 |
| 6,495,625 | B1 | * | 12/2002 | Abe et al. | 524/495 |
| 6,875,509 | B2 | * | 4/2005 | Ando | 428/375 |
| 7,128,971 | B2 | * | 10/2006 | Hyakutake et al. | 428/392 |
| 2004/0033356 | A1 | * | 2/2004 | Ando et al. | 428/375 |

(Continued)

FOREIGN PATENT DOCUMENTS

| EP | 1440999 A1 * | 7/2004 |
|---|---|---|
| JP | 48-17878 A | 6/1973 |

(Continued)

OTHER PUBLICATIONS

"BANI" Product Data Sheet, 1997.*

*Primary Examiner* — Jill Gray
(74) *Attorney, Agent, or Firm* — Crowell & Moring LLP

(57) ABSTRACT

There is disclosed a glass-fiber coating liquid for forming a coating layer on a glass fiber cord, prepared in the form of an emulsion by dispersing a phenol resin, a vinylpyridine-styrene-butadiene copolymer (B) and a chlorosulfonated polyethylene (C) into water to form a coating layer on a glass fiber cord, wherein the phenol resin is a monohydroxybenzene-formaldehyde resin (A) obtained by reaction of monohydroxybenzene (D) and formaldehyde (E).

22 Claims, 3 Drawing Sheets

U.S. PATENT DOCUMENTS

| | | | |
|---|---|---|---|
| 2004/0087733 A1* | 5/2004 | Nishihata et al. | 525/390 |
| 2004/0229999 A1* | 11/2004 | Achten et al. | 525/55 |
| 2005/0003186 A1* | 1/2005 | Ando | 428/375 |
| 2005/0129943 A1* | 6/2005 | Ando | 428/375 |
| 2009/0137355 A1* | 5/2009 | Ogaki et al. | 474/271 |

FOREIGN PATENT DOCUMENTS

| | | | |
|---|---|---|---|
| JP | 10-25665 A | | 1/1988 |
| JP | 2-4715 | | 1/1990 |
| JP | 7-11012 | | 1/1995 |
| JP | 11-343472 A | | 12/1999 |
| JP | 3201330 B | | 6/2001 |
| JP | 3201331 B | | 6/2001 |
| JP | 2003-306874 A | | 10/2003 |
| JP | 4-126877 | | 4/2004 |
| JP | 2004-203730 A | | 7/2004 |
| JP | 2004-244785 A | | 9/2004 |
| JP | 2006104595 A | * | 4/2006 |
| JP | 2007063726 A | * | 3/2007 |
| JP | 2007063727 A | * | 3/2007 |
| JP | 2008133553 A | * | 6/2008 |
| JP | 2010007196 A | * | 1/2010 |
| JP | 2010138535 A | * | 6/2010 |
| JP | 2010222178 A | * | 10/2010 |
| JP | 2010222179 A | * | 10/2010 |
| JP | 2010222180 A | * | 10/2010 |
| JP | 2012026067 A | * | 2/2012 |
| JP | 2012067410 A | * | 4/2012 |
| JP | 2012067411 A | * | 4/2012 |
| JP | 2012067412 A | * | 4/2012 |

* cited by examiner

COATING LIQUID FOR COVERING GLASS FIBER AND RUBBER-REINFORCING GLASS FIBER USING SAME

TECHNICAL FIELD

The present invention relates to a glass-fiber coating liquid for forming a coating layer on a glass fiber usable as a reinforcement in various rubber products, so as to enhance adhesion of the glass fiber to a base rubber material, and also relates to a rubber-reinforcing glass fiber using the coating liquid.

BACKGROUND OF THE INVENTION

In order to provide a rubber product such as a transmission belt or a tire with tensile strength and dimensional stability, it is common practice to embed a high-strength fiber e.g. a glass fiber, a nylon fiber or a polyester fiber as a reinforcement in a base rubber of the rubber product. The rubber-reinforcing fiber, for use as the reinforcement embedded in the base rubber, needs to have good adhesion to the base rubber to define a tight interface between the rubber-reinforcing fiber and the base rubber and prevent separation of the rubber-reinforcing fiber from the base rubber. The glass fiber itself cannot however be adhered to the base rubber and, even if adhered, shows such weak adhesion as to cause interfacial separation between the glass fiber and the base rubber and fail to function properly as the reinforcement.

There is accordingly often used in e.g. the transmission belt a rubber-reinforcing glass fiber produced by preparing a glass-fiber coating liquid in which a resorcinol-formaldehyde resin and various latex components are dispersed in water, and then, applying and drying a coating layer of the glass-fiber coating liquid onto a glass fiber cord of filament yarn, so as to enhance adhesion between the glass fiber and the base rubber and prevent interfacial separation of the glass fiber from the base rubber. The coating layer has the effect of adhering the glass fiber to the base rubber when the rubber-reinforcing glass fiber is embedded in the base rubber and formed into the transmission belt under high-temperature conditions, but the strength of adhesion between the glass fiber and the base rubber is not always sufficient. For example, a heat-resistant rubber such as hydrogenated nitrile rubber (hereinafter abbreviated as "HNBR") is employed as the base rubber of the automotive transmission belt for use in a high-temperature engine room environment. In the case where the rubber-reinforcing glass fiber is treated only with the above coating process and embedded in the heat-resistant base rubber, however, the transmission belt cannot maintain adhesion strength between the rubber-reinforcing glass fiber and the base rubber during running where the transmission belt is continuously bent under high-temperature conditions. This can result in the occurrence of interfacial separation between the rubber-reinforcing glass fiber and the base rubber during long hours of running.

In view of the foregoing, Patent Documents 1 to 6 propose the production of rubber-reinforcing glass fibers for use in transmission belts, by performing the above coating process to form primary coating layers on glass fiber cords and applying and drying secondary coating liquids of different compositions to form secondary coating layers on the primary coating layers, such that the transmission belts become able to maintain adhesion of the rubber-reinforcing glass fibers to cross-linked HNBR belt materials, without causing interfacial separation between the rubber-reinforcing glass fibers and the cross-linked HNBR materials, and to secure long-term reliability even under high-temperature running conditions.

More specifically, Patent Document 1 discloses a coating treatment technique that uses a secondary coating liquid containing a halogen-containing polymer and an isocyanate.

Patent Document 2 discloses a rubber-reinforcing glass fiber cord produced by applying, drying and curing onto a rubber-reinforcing glass fiber a primary coating of treatment liquid containing a resorcinol-formaldehyde condensate and a rubber latex, and then, applying drying and curing a secondary coating of different treatment liquid onto the primary coating, wherein the secondary coating treatment liquid contains as main components a rubber-blended material, a vulcanization agent and a maleimide-based vulcanization accelerator.

Patent Document 3 discloses a rubber-reinforcing glass fiber cord produced by applying, drying and curing onto a rubber-reinforcing glass fiber a primary coating of treatment liquid containing a resorcinol-formaldehyde condensate and a rubber latex, and then, applying drying and curing a secondary coating of different treatment liquid onto the primary coating, wherein the secondary coating treatment liquid contains as main components a rubber-blended material, a vulcanization agent and a dimethacrylate-based vulcanization accelerator and the rubber-blended material is a mixed rubber solution of a hydrogenated nitrile rubber and a hydrogenated nitrile rubber in which zinc methacrylate is dispersed.

Patent Document 4 discloses a rubber-reinforcing fiber treatment liquid containing a rubber latex, a water-soluble resorcinol-formaldehyde condensate and a triazinethiol.

Patent Document 5, filed by the present applicant, discloses a rubber-reinforcing glass fiber material produced by applying and drying onto a glass fiber a coating of emulsified glass-fiber coating liquid in which an acrylic ester resin, a vinylpyridine-stylene-butadiene copolymer and a resorcinol-formaldehyde resin are dispersed in water, and then, applying another coating of glass-fiber coating liquid in which a halogen-containing polymer and 0.3 to 10.0% by weight of a bis-allylnagiimide, with respect to the weight of the halogen-containing polymer, are dispersed in an organic solvent. This rubber-reinforcing glass fiber material has been proven to show good adhesion to HNBR.

Patent Document 6, filed by the present applicant, discloses a rubber-reinforcing glass fiber material produced by applying, drying and curing onto a glass fiber a primary coating of glass-fiber coating liquid in which a resorcinol-formaldehyde resin and a rubber latex are dispersed in water, and then, applying, drying and curing onto the primary coating a secondary coating of different glass-fiber coating liquid in which a bis-allylnagiimide, a rubber elastomer, a vulcanization agent and an inorganic filler are dispersed in an organic solvent. This rubber-reinforcing glass fiber material has also been proven to show good adhesion to HNBR and, when embedded in HNBR for use as the reinforcement in the transmission belt, show high heat resistance without a deterioration in tensile strength even after long hours of running under high-temperature conditions.

As discussed above, the conventional heat-resistant transmission belt is produced by applying and drying the glass-fiber coating liquid of resorcinol-formaldehyde resin, vinylpyridine-stylene-butadiene copolymer and chlorosulfonated polyethylene onto the glass fiber cord and embedding the resulting rubber-reinforcing glass fiber in the heat-resistant HNBR material. Further, the rubber-reinforcing glass fiber is generally provided with the secondary coating layer before embedded in the heat-resistant HNBR material.

Patent Document 1: Japanese Examined Patent Publication No. 2-4715
Patent Document 2: Japanese Patent No. 3201330
Patent Document 3: Japanese Patent No. 3201331
Patent Document 4: Japanese Laid-Open Patent Publication No. 10-25665
Patent Document 5: Japanese Laid-Open Patent Publication No. 2004-203730
Patent Document 6: Japanese Laid-Open Patent Publication No. 2004-244785

SUMMARY OF THE INVENTION

For use of the rubber-reinforcing glass fiber as the reinforcement embedded in the base rubber of the transmission belt, the coating is applied to the glass fiber cord to enhance adhesion between the rubber-reinforcing glass fiber and the base rubber.

The above conventional transmission belt secures initial strength of adhesion between the rubber-reinforcing coated glass fiber cord and the base rubber, but does not combine high water resistance and high heat resistance to maintain initial tensile strength without changes in dimension even after long hours of running under high-temperature high-humidity conditions. The conventional transmission belt is particularly inferior in water resistance.

It is required that the transmission belt, for automotive use, is capable of withstanding exposure to engine heat and rainy weather. Namely, the transmission belt needs to have both of heat resistance and water resistance so as to show good dimensional stability and maintain tensile strength after long hours of running under high-temperature high-humidity conditions.

The development of a rubber-reinforcing glass fiber having a glass fiber cord covered with a coating layer to show equal or higher strength of adhesion to the heat-resistant rubber material, as compared to the conventional transmission belt produced by embedding either of the rubber-reinforcing glass fibers of Patent Documents 1 to 6 in the heat-resistant rubber, attain heat resistance to maintain initial strength of adhesion between the glass fiber and the rubber after long hours of running under high-temperature conditions and attain water resistance to prevent water penetration into the glass fiber cord and maintain initial strength of adhesion between the glass fiber and the rubber after long hours of running under wet conditions has been thus awaited.

As a result of extensive researches, the present inventors have found that, when a rubber-reinforcing glass fiber is produced by preparing a glass-fiber coating liquid containing a vinylpyridine-stylene-butadiene copolymer, a chlorosulfonated polyethylene and a monohydroxybenzene-formaldehyde resin obtained by reaction of monohydroxybenzene and formaldehyde, applying and drying a coating layer of the glass-fiber coating liquid onto a glass fiber cord and providing an additional coating layer on the preceding coating layer and is then embedded in a HNBR material for use as a transmission belt, it becomes possible to achieve good adhesion between the rubber-reinforcing glass fiber and the heat-resistant rubber and provide the transmission belt with high water and heat resistance to maintain tensile strength and show good dimensional stability after long hours of running under high-temperature wet conditions.

In other words, there is provided according to the present invention a glass-fiber coating liquid for forming a coating layer on a glass fiber cord, prepared in the form of an emulsion by dispersing a phenol resin, a vinylpyridine-stylene-butadiene copolymer (B) and a chlorosulfonated polyethylene (C) into water, wherein the phenol resin is a monohydroxybenzene-formaldehyde resin (A) obtained by reaction of monohydroxybenzene (D) and formaldehyde (E).

DETAILED DESCRIPTION OF THE EMBODIMENTS

Figure 1:
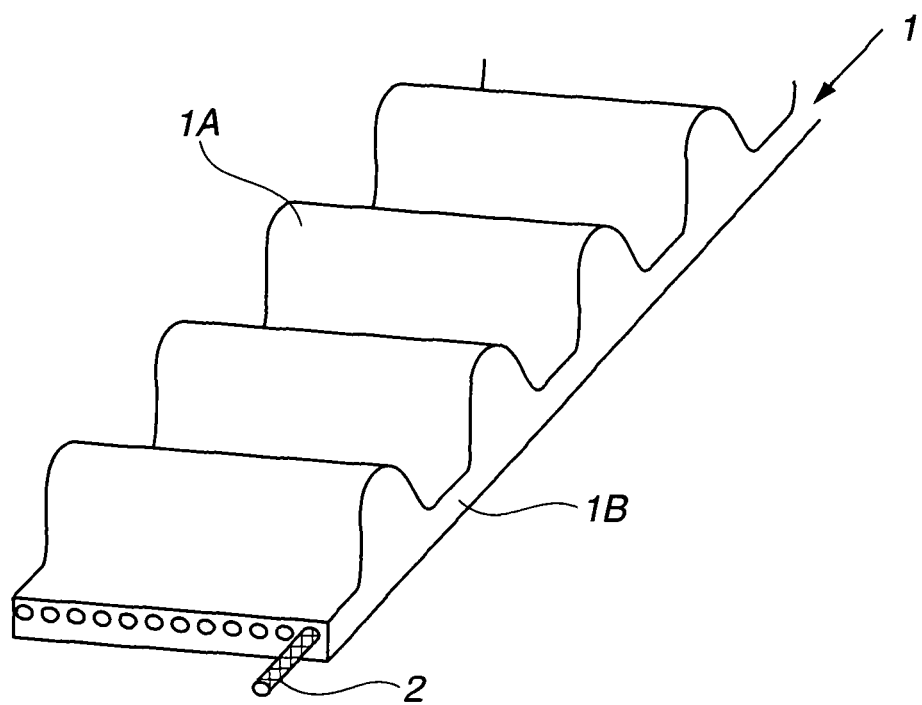
FIG. 1 is a perspective sectional view of a transmission belt produced by embedding a rubber-reinforcing glass fiber in a heat-resistant rubber.

A rubber-reinforcing glass fiber in which a glass-fiber coating liquid of the present invention is applied to form a coating layer on a glass fiber cord shows, when embedded in a heat-resistant rubber material such as HNBR cross-linked with sulfur or peroxide, good adhesion to the cross-linked HNBR material. Further, a transmission belt in which the above rubber-reinforcing glass fiber is embedded in the cross-linked HNBR material combines heat resistance and water resistance to ensure good dimensional stability and maintain tensile strength, without the possibility of interfacial separation between the glass fiber and the heat-resistant rubber material, even after long hours of use i.e. running under high-temperature high-humidity conditions.

The glass-fiber coating liquid of the present invention is prepared by dispersing a monohydroxybenzene-formaldehyde resin (A) as a phenol resin, a vinylpyridine-stylene-butadiene copolymer (B) and a chlorosulfonated polyethylene (C) into water and is then applied and dried onto the glass fiber cord. The thus-formed coating layer is supposed to have the function of preventing water penetration into the glass fiber cord. Another glass-fiber coating liquid is applied and dried to form a secondary coating layer on the above coating layer.

As compared to conventional rubber-reinforcing glass fibers, the rubber-reinforcing glass fiber of the present invention is capable of protecting the glass fiber cord from water penetration and, when embedded in the heat-resistant rubber material such as cross-linked HNBR for use as the transmission belt, imparting not only high heat resistance but also high water resistance to the transmission belt.

In the present invention, the dispersion system of the monohydroxybenzene-formaldehyde resin (A), the vinylpyridine-stylene-butadiene copolymer (B), the chlorosulfonated polyethylene (C) and water is used as the glass-fiber coating liquid to form the primary coating layer on the glass fiber cord as mentioned above.

Herein, the transmission belt refers to a power transmission belt for driving an engine or another machinery device from a power source such as engine or motor. Examples of the transmission belt are a synchronous belt that allows power transmission by mesh gearing and a V belt that allows power transmission by friction gearing. The automotive transmission belt is one type of heat-resistant transmission belt used in an automotive engine room and exemplified as a timing belt having teeth in mesh with pulley teeth to transmit a crankshaft rotation to a timing gear and thereby drive an engine camshaft for valve open/close timing control.

As the monohydroxybenzene-formaldehyde resin (A) of the glass-fiber coating liquid of the present invention, a water-soluble or water-solvent resol resin obtained by reacting monohydroxybenzene (D) with formaldehyde (E) at a mole ratio of the formaldehyde (E) to the monohydroxybenzene (D) of 0.5 to 3.0, i.e., E/D=0.5 to 3.0 in the presence of a base catalyst is usable. If the mole ratio of the formaldehyde (E) to the monohydroxybenzene (D) is less than 0.5, the adhesion between the rubber-reinforcing glass fiber and the heat-resistant rubber becomes weak. If the mole ratio of the formaldehyde (E) to the monohydroxybenzene (D) exceeds 0.3, the glass-fiber coating liquid becomes prone to gelation. The mole ratio E/D is preferably within the range of 0.3 to 1.2.

An example of the monohydroxybenzene-formaldehyde resin (A) suitable for use in the glass-fiber coating liquid of the present invention is a phenol resin commercially available under the trade name of Resitop PL-4667 from Gun Ei Chemical Industry Co., Ltd.

The base catalyst can be either lithium hydroxide, sodium hydroxide, potassium hydroxide, magnesium hydroxide, calcium hydroxide or barium hydroxide.

As the vinylpyridine-stylene-butadiene copolymer (B) of the glass-fiber coating liquid of the present invention, a copolymer of vinylpyridine, stylene and butadiene with a vinylpyridine/stylene/butadiene weight ratio of (10-20):(10-20):(80-60) is preferably usable. Examples of the vinylpyridine-stylene-butadiene copolymer (B) suitable for use in the glass-fiber coating liquid of the present invention are those commercially available under the trade name of Pyratex from Nippon A&L Inc., under the trade name of 0650 from JSR Corporation and under the trade name of Nipol 1218FS from Nippon Zeon Corporation. In the case where the vinylpyridine-stylene-butadiene copolymer (B) is out of the above-specified weight ratio range, the rubber-reinforcing glass fiber shows relatively weak adhesion to the base rubber material even when the glass-fiber coating liquid is applied and dried onto the glass fiber cord.

As the chlorosulfonated polyethylene (C) of the glass-fiber coating liquid of the present invention, a chlorosulfonated polyethylene having a chlorine content of 20.0 to 40.0% by weight and a sulfone sulfur content of 0.5 to 2.0% by weight is preferably usable. An example of the chlorosulfonated polyethylene (C) suitable for use in the glass-fiber coating liquid is the one commercially available as a latex having a solid matter content of about 40% by weight under the trade name of CSM-450 from Sumitomo Seika Chemicals Co., Ltd. In the case where the chlorine and sulfone sulfur contents of the chlorosulfonated polyethylene (C) are out of the above-specified ranges, the rubber-reinforcing glass fiber shows relatively weak adhesion to the cross-linked HNBR base material even when the glass-fiber coating liquid is applied and dried onto the glass fiber cord.

In order to achieve a desired strength of adhesion between the rubber-reinforcing glass fiber and the base rubber material for use in the transmission belt, it is desirable that the glass-fiber coating liquid contains 1.0 to 15.0% by weight of the monohydroxybenzene-formaldehyde resin (A), 45.0 to 82.0% by weight of the vinylpyridine-stylene-butadiene copolymer (B) and 3.0 to 40.0% by weight of the chlorosulfonated polyethylene (C) based on 100% of the total weight of the monohydroxybenzene-formaldehyde resin (A), the vinylpyridine-stylene-butadiene copolymer (B) and the chlorosulfonated polyethylene (C), i.e., the component weight percentages A/(A+B+C), B/(A+B+C) and C/(A+B+C) are within the range of 1.0 to 15.0%, 45.0 to 82.0% and 3.0 to 40.0%, respectively.

If the content of the monohydroxybenzene-formaldehyde resin (A) in the glass-fiber coating liquid is less than 1.0%, the application of such a coating liquid to the glass fiber cord results in weak adhesion between the glass fiber and the base rubber so that it is difficult to provide the transmission belt with suitable water resistance and heat resistance. If the content of the monohydroxybenzene-formaldehyde resin (A) in the glass-fiber coating liquid exceeds 15.0%, it is likely that the coating liquid will become unusable due to coagulation and precipitation. For this reason, the content of the monohydroxybenzene-formaldehyde resin (A) in the glass-fiber coating liquid is preferably within the range of A/(A+B+C) =1.0 to 15.0% by weight, more preferably 2.0 to 10.0% by weight, based on 100% of the total weight of the monohydroxybenzene-formaldehyde resin (A), the vinylpyridine-stylene-butadiene copolymer (B) and the chlorosulfonated polyethylene (C).

If the content of the vinylpyridine-stylene-butadiene copolymer (B) in the glass-fiber coating liquid is less than 45.0%, the application of such a coating liquid to the glass fiber cord also results in weak adhesion between the glass fiber and the cross-linked HNBR so that it is difficult to provide the transmission belt with suitable heat resistance. If the content of the vinylpyridine-stylene-butadiene copolymer (B) in the glass-fiber coating liquid exceeds 82.0%, the application of such a coating liquid to the glass fiber cord is likely to result in transfer of the coating layer due to coating stickiness and cause various problems such as process contamination. The content of the vinylpyridine-stylene-butadiene copolymer (B) in the glass-fiber coating liquid is thus preferably within the range of B/(A+B+C)=45.0 to 82.0% by weight, more preferably 55.0 to 75.0% by weight, based on 100% of the total weight of the monohydroxybenzene-formaldehyde resin (A), the vinylpyridine-stylene-butadiene copolymer (B) and the chlorosulfonated polyethylene (C).

If the content of the chlorosulfonated polyethylene (C) in the glass-fiber coating liquid is less than 3.0%, it becomes difficult to impart a desired level of heat resistance to the transmission belt. If the content of the chlorosulfonated polyethylene (C) in the glass-fiber coating liquid exceeds 40.0%, the adhesion between the glass fiber and the base rubber becomes weak so that it is difficult to provide the transmission belt with suitable heat resistance. The content of the chlorosulfonated polyethylene (C) in the glass-fiber coating liquid is thus preferably within the range of C/(A+B+C)=3.0 to 40.0% by weight, more preferably 20.0 to 35.0% by weight, based on 100% of the total weight of the monohydroxybenzene-formaldehyde resin (A), the vinylpyridine-stylene-butadiene copolymer (B) and the chlorosulfonated polyethylene (C).

In the present invention, another rubber elastomer may be used in place of a part of the vinylpyridine-stylene-butadiene copolymer (B) as the component of the glass-fiber coating liquid used in the rubber-reinforcing glass fiber. When the vinylpyridine-stylene-butadiene copolymer is used alone as the coating liquid component, it becomes likely that the rubber-reinforcing glass fiber will undergo transfer of the coating layer due to coating stickiness and raise workability deterioration problems such as process contamination. A stylene-butadiene copolymer (F) compatible with the vinylpyridine-stylene-butadiene copolymer (B) is preferably usable as such a rubber elastomer without causing impairments of the adhesion between the rubber-reinforcing glass fiber and the base rubber and the heat resistance of the base rubber required for use in the transmission belt, although there can alternatively be used as the rubber elastomer a carboxyl-modified styrene-butadiene rubber, an acrylonitrile-butadiene rubber or the like.

The stylene-butadiene copolymer (F) can be used in place of the vinylpyridine-stylene-butadiene copolymer (B) in an amount of F/B=5.0 to 80.0% by weight based on 100% of the weight of the vinylpyridine-stylene-butadiene copolymer (B). If the content of the stylene-butadiene copolymer (F) is less than 5.0%, there is no effect of preventing the coating layer of the rubber-reinforcing glass fiber from transferring due to coating stickiness. The content of the stylene-butadiene copolymer (F) is preferably 25.0% or more. If the content of the stylene-butadiene copolymer (F) exceeds 80.0%, there arise losses of the adhesion of the rubber-reinforcing glass fiber to the base rubber and, when the rubber-reinforcing glass fiber is embedded in the heat-resistant base rubber for use as the transmission belt, the heat resistance of the transmission belt. The content of the stylene-butadiene copolymer (F) is preferably 55.0% or less.

An example of the stylene-butadiene copolymer (F) suitable for use in the glass-fiber coating liquid of the present invention is the one commercially available under the trade name of J-9049 from Nippon A&L Inc.

The glass-fiber coating liquid of the present invention may further include other additives such as an antioxidant, a pH adjuster and a stabilizer. Examples of the antioxidant are diphenylamine compounds. An example of the pH adjuster is ammonium.

Next, an explanation will be given to a first embodiment of the present invention in which the rubber-reinforcing glass fiber is produced by applying and drying the above glass-fiber coating liquid to form the primary coating layer on the glass fiber cord, and then, applying the secondary glass-fiber coating liquid to form the secondary coating layer on the primary coating layer.

It is preferable to form the secondary coating layer of the secondary glass-fiber coating liquid in which a halogen-containing polymer (G) and a bis-allylnagiimide (H) are dispersed in an organic solvent, after applying and drying the primary coating layer of the above glass-fiber coating liquid onto the glass fiber cord, for production of the rubber-reinforcing glass fiber. When the rubber-reinforcing glass fiber is formed with such a secondary coating layer and embedded in the base rubber, notably heat-resistant cross-linked HNBR material, of the transmission belt, it becomes possible to provide good adhesion between the glass fiber and the base rubber so that the rubber-reinforcing glass fiber functions effectively as the reinforcement in the transmission belt. It becomes further possible for the coating layer to provide high heater and water resistance, show good dimensional stability and maintain tensile strength after long hours of running of the transmission belt under high-temperature high-humidity conditions. As the organic solvent of the secondary glass-fiber coating liquid, there can be used xylene.

Especially when produced by applying and drying the glass-fiber coating liquid of the present invention, in which the monohydroxybenzene-formaldehyde resin (A) obtained by reaction of monohydroxybenzene (D) and formaldehyde (E), the vinylpyridine-stylene-butadiene copolymer (B) and the chlorosulfonated polyethylene (C) are dispersed in water, onto the glass fiber cord, applying the secondary glass-fiber coating liquid in which the halogen-containing polymer (G) and 0.3 to 10.0% by weight of the bis-allylnagiimide (H) based on 100% of the weight of the halogen-containing polymer (G), i.e., H/G=0.3 to 10.0% are dispersed in the organic solvent to form the secondary coating layer with a content of the halogen-containing polymer (G) of 10.0 to 70.0% by weight based on the weight of the secondary coating layer, and then, embedding the resulting rubber-reinforcing glass fiber in the cross-linked HNBR material, the transmission belt combines heat resistance and water resistance to secure good dimensional stability and tensile strength and maintain initial adhesion strength between the coated glass fiber and the cross-linked HNBR material even after long hours of running under high-temperature high-humidity conditions as compared to the conventional transmission belts.

If the content of the halogen-containing polymer (G) in the secondary coating layer is less than 10.0%, it becomes difficult to obtain the above mentioned high heat resistance. If the content of the halogen-containing polymer (G) in the secondary coating layer exceeds 70.0%, the adhesion between the glass fiber and the base rubber becomes so weak that the transmission belt is inferior in durability. The content of the halogen-containing polymer (G) in the secondary coating layer is preferably within the range of 25.0 to 60.0%.

At this time, the content of the bis-allylnagiimide (H) in the secondary glass-fiber coating liquid is preferably controlled to 0.3 to 10.0% by weight based on 100% of the weight of the halogen-containing polymer (G), i.e., H/G=0.3 to 10.0% as mentioned above. If the content of the bis-allylnagiimide (H) in the secondary glass-fiber coating liquid is less than 0.3%, it is difficult to attain the above mentioned high heat resistance. If the content of the bis-allylnagiimide (H) in the secondary glass-fiber coating liquid exceeds 10.0%, the adhesion between the glass fiber and the base rubber becomes so weak that the transmission belt is inferior in durability. The content of the bis-allylnagiimide (H) in the secondary glass-fiber coating liquid is more preferably within the range of 0.3 to 2.0%.

The bis-allylnagiimide (H) is one kind of thermosetting imide resin and, when being of low molecular weight, shows good compatibility with another resin. After the curing, the bis-allylnagiimide resin has a glass transition temperature of 300° C. or higher and thus produces the effect of increasing the heat resistance of the transmission belt.

There can be used, as the bis-allylnagiimide (H), N-N'-hexamethylene diallylnagiimide, N-N'-(m-xylylene) diallylnagiimide and N-N'-(4,4'-diphenylmethane) diallylnagiimide. Among others, N-N'-hexamethylene diallylnagiimide is preferred.

Example of the bis-allylnagiimide (H) suitable for used in the rubber-reinforcing glass fiber of the present invention are those commercially available under the trade names of "BANI-M", "BANI-H" and "BANI-X" from Maruzen Petrochemical Co., Ltd.

An explanation will be next given to a second embodiment of the present invention in which the rubber-reinforcing glass fiber is produced by applying and drying the above glass-fiber coating liquid to form the primary coating layer on the glass fiber cord, and then, applying the secondary glass-fiber coating liquid to form the secondary coating layer on the primary coating layer.

It is preferable to form the secondary coating layer of the secondary glass-fiber coating liquid in which a halogen-containing polymer (G) and a zinc methacrylate (I) are dispersed in an organic solvent, after applying and drying the primary coating layer of the above glass-fiber coating liquid onto the glass fiber cord, for production of the rubber-reinforcing glass fiber. When the rubber-reinforcing glass fiber is formed with such a secondary coating layer and embedded in the base rubber, notably heat-resistant cross-linked HNBR material, of the transmission belt, it becomes possible to provide good adhesion between the glass fiber and the base rubber so that the rubber-reinforcing glass fiber functions effectively as the reinforcement in the transmission belt. It becomes further possible for the coating layer to provide high heater and water resistance, shown good dimensional stability and maintain tensile strength after long hours of running of the transmission belt under high-temperature high-humidity conditions. As the organic solvent of the secondary glass-fiber coating liquid, there can be used xylene.

Especially when produced by applying and drying the glass-fiber coating liquid of the present invention, in which the monohydroxybenzene-formaldehyde resin (A) obtained by reaction of monohydroxybenzene (D) and formaldehyde (E), the vinylpyridine-stylene-butadiene copolymer (B) and the chlorosulfonated polyethylene (C) are dispersed in water, onto the glass fiber cord, applying the secondary glass-fiber coating liquid in which the halogen-containing polymer (G), the zinc methacrylate (I) and 5.0 to 50.0% by weight of an organic diisocyanate (J) based on 100% of the weight of the halogen-containing polymer (G), i.e., J/G=5.0 to 50.0% are dispersed in the organic solvent to form the secondary coating layer with a content of the halogen-containing polymer (G) of 10.0 to 70.0% by weight based on the weight of the secondary coating layer, and then, embedding the resulting rubber-reinforcing glass fiber in the cross-linked HNBR material, the transmission belt combines heat resistance and water resistance to secure good dimensional stability and tensile strength and maintain initial adhesion strength between the coated glass fiber and the cross-linked HNBR material even after long hours of running under high-temperature high-humidity conditions as compared to the conventional transmission belts.

If the content of the halogen-containing polymer (G) in the secondary coating layer is less than 10.0%, it becomes difficult to obtain the above mentioned high heat resistance. If the content of the halogen-containing polymer (G) in the secondary coating layer exceeds 70.0%, the adhesion between the glass fiber and the base rubber becomes so weak that the transmission belt is inferior in durability. The content of the halogen-containing polymer (G) in the secondary coating layer is preferably within the range of 25.0 to 60.0%.

At this time, the content of the organic diisocyanate (J) in the secondary glass-fiber coating liquid is preferably controlled to 5.0 to 50.0% by weight based on 100% of the weight of the halogen-containing polymer (G), i.e., J/G=5.0 to 50.0% as mentioned above. If the content of the organic diisocyanate (G) in the secondary glass-fiber coating liquid is less than 5.0%, it is difficult to attain the above mentioned high heat resistance. If the content of the organic diisocyanate (G) in the secondary glass-fiber coating liquid exceeds 50.0%, the adhesion between the glass fiber and the base rubber becomes so weak that the transmission belt is inferior in durability.

There can be used, as the organic diisocyanate (J), hexamethylene diisocyanate, isophorone diisocyanate, methylene-bis(4-cyclohexylisocyanate), toluene diisocyanate, xylene diisocyanate, naphthalene diisocyanate, and methylene-bis(phenylisocyanate). Among others, methylene-bis(phenylisocyanate) and hexamethylene diisocyanate are preferred.

It is further desirable to prepare the secondary glass-fiber coating liquid by dispersing the halogen-containing polymer (G), the organic diisocyanate (J) and 0.001 to 3.0% by weight of the zinc methacrylate (I) based on 100% of the weight of the halogen-containing polymer (G), i.e., I/G=0.001 to 3.0% in the organic solvent and thereby form the secondary coating layer with a content of the halogen-containing polymer (G) of 10.0 to 70.0% by weight based on the weight of the secondary coating layer. When produced by providing the rubber-reinforcing glass fiber with such a secondary coating layer and embedding the rubber-reinforcing glass fiber in the cross-linked HNBR material, the transmission belt combines heat resistance and water resistance to secure good dimensional stability and tensile strength and maintain initial adhesion strength between the coated glass fiber and the cross-linked HNBR material even after long hours of running under high-temperature high-humidity conditions.

If the content of the halogen-containing polymer (G) in the secondary coating layer is less than 10.0%, it becomes difficult to obtain the above mentioned high heat resistance. If the content of the halogen-containing polymer (G) in the secondary coating layer exceeds 70.0%, the adhesion between the glass fiber and the base rubber becomes so weak that the transmission belt is inferior in durability. The content of the halogen-containing polymer (G) in the secondary coating layer is preferably within the range of 25.0 to 60.0%.

The content of the zinc methacrylate (I) in the secondary glass-fiber coating liquid is preferably controlled to 0.001 to 3.0% by weight based on 100% of the weight of the halogen-containing polymer (G), i.e., I/G=0.001 to 3.0% as mentioned above. If the content of the zinc methacrylate (I) in the secondary glass-fiber coating liquid is less than 0.001%, it is difficult to attain the above mentioned high heat resistance. If the content of the zinc methacrylate (I) in the secondary glass-fiber coating liquid exceeds 3.0%, the adhesion between the glass fiber and the base rubber becomes so weak that the transmission belt is inferior in durability.

An explanation will be next given to a third embodiment of the present invention in which the rubber-reinforcing glass fiber is produced by applying and drying the above glass-fiber coating liquid to form the primary coating layer on the glass fiber cord, and then, applying the secondary glass-fiber coating liquid to form the secondary coating layer on the primary coating layer.

It is preferable to form the secondary coating layer of the secondary glass-fiber coating liquid in which a halogen-containing polymer (G) and a maleimide (K) are dispersed in an organic solvent, after applying and drying the primary coating layer of the above glass-fiber coating liquid onto the glass fiber cord, for production of the rubber-reinforcing glass fiber. When the rubber-reinforcing glass fiber is formed with such a secondary coating layer and embedded in the base rubber, notably heat-resistant cross-linked HNBR material, of the transmission belt, it becomes possible to provide good adhesion between the glass fiber and the base rubber so that the rubber-reinforcing glass fiber functions effectively as the reinforcement in the transmission belt. It becomes further possible for the coating layer to provide high heater and water resistance, show good dimensional stability and maintain tensile strength after long hours of running of the transmission belt under high-temperature high-humidity conditions. As the organic solvent of the secondary glass-fiber coating liquid, there can be used xylene.

Especially when produced by applying and drying the glass-fiber coating liquid of the present invention, in which the monohydroxybenzene-formaldehyde resin (A) obtained by reaction of monohydroxybenzene (D) and formaldehyde (E), the vinylpyridine-stylene-butadiene copolymer (B) and the chlorosulfonated polyethylene (C) are dispersed in water, onto the glass fiber cord, applying the secondary glass-fiber coating layer in which the halogen-containing polymer (G) and 20.0 to 90.0% by weight of the maleimide (K) based on 100% of the total weight of the halogen-containing polymer (G) and the maleimide (K), i.e., K/(G+K)=20.0 to 90.0% are disposed in the organic solvent to form the secondary coating layer with a content of the halogen-containing polymer (G) of 10.0 to 70.0% by weight based on the weight of the secondary coating layer, and then, embedding the resulting rubber-reinforcing glass fiber in the cross-linked HNBR material, the transmission belt combines heat resistance and water resistance to secure good dimensional stability and tensile strength and maintain initial adhesion strength between the coated glass fiber and the cross-linked HNBR material even after long hours of running under high-temperature high-humidity conditions as compared to the conventional transmission belts.

If the content of the halogen-containing polymer (G) in the secondary coating layer is less than 10.0%, it becomes difficult to obtain the above mentioned high heat resistance. If the content of the halogen-containing polymer (G) in the secondary coating layer exceeds 70.0%, the adhesion between the glass fiber and the base rubber becomes so weak that the transmission belt is inferior in durability. The content of the halogen-containing polymer (G) in the secondary coating layer is preferably within the range of 25.0 to 60.0%.

The content of the maleimide (K) in the secondary glass-fiber coating liquid is preferably controlled to 20.0 to 90.0% by weight based on 100% of the total weight of the halogen-containing polymer (G) and the maleimide (K), i.e., K/(G+K)=20.0 to 90.0%. If the content of the maleimide (K) in the secondary glass-fiber coating liquid is less than 20.0%, it is difficult to attain the above mentioned high heat resistance. If the content of the maleimide (K) in the secondary glass-fiber coating liquid exceeds 90.0%, the adhesion between the glass fiber and the base rubber becomes so weak that the transmission belt is inferior in durability.

There can be used, as the maleimide (K), N,N-m-phenylene di-maleimide, 4,4'-diphenylmethane bis-maleimide, polyphenylmethane maleimide, m-phenylene bis-maleimide, 4-methyl-1,3-phenylene bis-maleimide, 4,4'-diphenylether bis-maleimide, 4,4'-diphenylsulfone bis-maleimide, chlorophenyl maleimide, methylphenyl maleimide, hydroxyphenyl maleimide, carboxyphenyl maleimide, dodecyl maleimide and cyclohexyl maleimide. Among others, N,N-m-phenylene di-maleimide is preferred.

An explanation will be next given to a fourth embodiment of the present invention in which the rubber-reinforcing glass fiber is produced by applying and drying the above glass-fiber coating liquid to form the primary coating layer on the glass fiber cord, and then, applying the secondary glass-fiber coating liquid to form the secondary coating layer on the primary coating layer.

It is preferable to form the secondary coating layer of the secondary glass-fiber coating liquid in which a halogen-containing polymer (G), a vulcanization agent (L), a triazine compound (M) and an inorganic filler (N) are dispersed in an organic solvent, after applying and drying the primary coating layer of the above glass-fiber coating liquid onto the glass fiber cord, for production of the rubber-reinforcing glass fiber. When the rubber-reinforcing glass fiber is formed with such a secondary coating layer and embedded in the base rubber, notably heat-resistant cross-linked HNBR material, of the transmission belt, it becomes possible to provide good adhesion between the glass fiber and the base rubber so that the rubber-reinforcing glass fiber functions effectively as the reinforcement in the transmission belt. It becomes further possible for the coating layer to provide high heater and water resistance, show good dimensional stability and maintain tensile strength after long hours of running of the transmission belt under high-temperature high-humidity conditions. As the organic solvent of the secondary glass-fiber coating liquid, there can be used xylene.

Especially when produced by applying and drying the glass-fiber coating liquid of the present invention, in which the monohydroxybenzene-formaldehyde resin (A) obtained by reaction of monohydroxybenzene (D) and formaldehyde (E), the vinylpyridine-stylene-butadiene copolymer (B) and the chlorosulfonated polyethylene (C) are dispersed in water, onto the glass fiber cord, applying the secondary glass-fiber coating liquid in which the triazine compound (M) is dispersed in the organic solvent in an amount of M/G=0.3 to 10.0% based on 100% of the weight of the halogen-containing polymer (G) to form the secondary coating layer with a content of the halogen-containing polymer (G) of 10.0 to 70.0% by weight based on the weight of the secondary coating layer, and then, embedding the resulting rubber-reinforcing glass fiber in the cross-linked HNBR material, the transmission belt combines heat resistance and water resistance to secure good dimensional stability and tensile strength and maintain initial adhesion strength between the coated glass fiber and the cross-linked HNBR material even after long hours of running under high-temperature high-humidity conditions as compared to the conventional transmission belt.

If the content of the halogen-containing polymer (G) in the secondary coating layer is less than 10.0%, it becomes difficult to obtain the above mentioned high heat resistance. If the content of the halogen-containing polymer (G) in the secondary coating layer exceeds 70.0%, the adhesion between the glass fiber and the base rubber becomes so weak that the transmission belt is inferior in durability. The content of the halogen-containing polymer (G) in the secondary coating layer is preferably within the range of 25.0 to 60.0%.

At this time, the content of the triazine compound (M) in the secondary glass-fiber coating liquid is preferably controlled to 0.3 to 10.0% by weight based on 100% of the weight of the halogen-containing polymer (G), i.e., M/G=0.3 to 10.0%. If the content of the triazine compound (M) in the secondary glass-fiber coating liquid is less than 0.3%, it is difficult to attain the above mentioned high heat resistance. If the content of the triazine compound (M) in the secondary glass-fiber coating liquid exceeds 10.0%, the adhesion between the glass fiber and the base rubber becomes so weak that the transmission belt is inferior in durability.

There can be used, as the triazine compound (M), triallyl cyanurate and triallyl isocyanurate.

In each of the first to fourth embodiments of the present invention where the rubber-reinforcing glass fiber is produced by applying and drying the above glass-fiber coating liquid to form the primary coating layer on the glass fiber cord, and then, applying the secondary glass-fiber coating liquid to form the secondary coating layer on the primary coating layer, it is desirable to add a vulcanization agent (L) in the secondary glass-fiber coating liquid. The content of the vulcanization agent (L) in the secondary glass-fiber coating liquid is preferably within the range of 0.5 to 50.0% based on 100% of the weight of the halogen-containing polymer (G), i.e., L/G=0.5 to 50.0%. If the content of the vulcanization agent (L) in the secondary glass-fiber coating liquid is less than 0.5%, it becomes difficult to obtain the above mentioned high heat resistance. If the content of the vulcanization agent (L) in the secondary glass-fiber coating liquid exceeds 50.0%, the adhesion between the glass fiber and the base rubber becomes so weak that the transmission belt is inferior in durability.

Examples of the vulcanization agent (L) are nitroso compounds and/or zinc compounds.

It is also desirable to add an inorganic filler (N) in the secondary glass-fiber coating liquid in each of the first to fourth embodiments of the present invention where the rubber-reinforcing glass fiber is produced by applying and drying the above glass-fiber coating liquid to form the primary coating layer on the glass fiber cord, and then, applying the secondary glass-fiber coating liquid to form the secondary coating layer on the primary coating layer. The content of the inorganic filler (N) in the secondary glass-fiber coating liquid is preferably within the range of 10.0 to 70.0% based on 100% of the weight of the halogen-containing polymer (G), i.e., N/G=10.0 to 70.0%. If the content percentage of the inorganic filler (N) in the secondary glass-fiber coating liquid is less than 10.0%, it becomes difficult to obtain the above mentioned high heat resistance. If the content percentage of the inorganic filler (N) in the secondary glass-fiber coating liquid exceeds 70.0%, the adhesion between the glass fiber and the base rubber becomes so weak that the transmission belt is inferior in durability.

Examples of the inorganic filler (N) are carbon black and magnesium oxide.

The addition of the nitroso compound such as p-nitrosobenzene as the vulcanization agent (L) and the inorganic filler (N) such as carbon black or magnesium oxide into the secondary glass-fiber coating liquid is more effective in, when the rubber-reinforcing glass fiber is formed with the secondary coating layer and embedded in the base rubber for use as the transmission belt, increasing the heat resistant of the transmission belt.

The transmission belt attains higher heat resistance when produced by applying the secondary glass-fiber coating liquid containing 0.5 to 20.0% by weight of the vulcanization agent (L) and 10.0 to 70.0% by weight of the inorganic filler (N) based on 100% of the weight of the halogen-containing polymer (G) to form the secondary coating layer on the rubber-reinforcing glass fiber, and then, embedding the resulting rubber-reinforcing glass fiber in the heat-resistant rubber material. If the content of the vulcanization agent (L) is less than 0.5% and if the content percentage of the inorganic filler (N) is less than 10.0%, it may be difficult to obtain a sufficient heat resistance improvement effect. There is no need to add more than 20% of the vulcanization agent (L) and more than 70% of the inorganic filler (N).

In view of the heat resistance, it is desirable to use a chlorosulfonated polyethylene (C) as theF halogen-containing polymer (G).

EXAMPLES

Test samples of rubber-reinforcing glass fibers were produced by preparing the glass-fiber coating liquid of the present invention in the form of an emulsion of water, a monohydroxybenzene-formaldehyde resin (A), a vinylpyridine-styrene-butadiene copolymer (B) and a chlorosulfonated polyethylenes (C), applying and drying the glass-fiber coating liquid onto glass fiber cords, preparing the secondary glass-fiber coating liquid in the form of a dispersion system of an organic solvent and either a halogen-containing polymer (G) and a bis-allylnagiimide (H), a halogen-containing polymer (G), an organic diisocyanate (J) and zinc methacrylate (I), a halogen-containing polymer (G) and a maleimide (K) or a halogen-containing polymer (G) and a triazine compound (M) and applying the secondary glass-fiber coating liquid. (Examples 1-8)

Test samples of rubber-reinforcing glass fibers (Comparative Examples 1-3) departing from the scope of the present invention were produced. For performance comparisons, the rubber-reinforcing glass fibers (Examples 1-8) according to the present invention and the rubber-reinforcing glass fibers (Comparative Examples 1-3) not according to the present invention were tested for their strength of adhesion to heat-resistant rubber materials.

Further, transmission belts were produced by embedding the above rubber-reinforcing glass fibers in heat-resistant rubber materials. Each of the transmission belts having the rubber-reinforcing glass fibers (Examples 1, 2 and 4-8) according to the present invention and the rubber-reinforcing glass fibers (Comparative Examples 1-3) not according to the present invention was subjected to water-resistance running fatigue test. The water-resistance running fatigue test was performed by running the transmission belt around pulleys for long hours under wet conditions so as to test whether the transmission belt could secure good dimensional stability without change in tensile strength after long hours of running, owing to the ability of the coating layer to maintain initial strength of adhesion to the base rubber material, and thereby evaluate belt water resistance with comparisons of the test results. Each of the transmission belts having the rubber-reinforcing glass fibers (Examples 2 and 4-8) according to the present invention and the rubber-reinforcing glass fibers (Comparative Examples 1 and 2) not according to the present invention was also subjected to heat-resistance and flexion-resistance running fatigue. The heat-resistance and flexion-resistance running fatigue was performed by bending and running the transmission belt around a plurality of pulleys for long hours under high-temperature conditions so as to test whether the transmission belt could secure good dimensional stability without change in tensile strength after long hours of running, owing to the ability of the coating layer to maintain initial strength of adhesion to the base rubber material, and thereby evaluate belt heat resistance with comparisons of the test results.

A detail explanation of these examples and comparative examples will be given below.

Example 1

(Preparation of Glass-Fiber Coating Liquid of the Invention)

The synthesis of the monohydroxybenzene-formaldehyde resin (A) will be first explained below. A three-neck separable flask having a reflux condenser, a temperature gauge and a stirrer was charged with 100 parts by weight of monohydroxybenzene (D), 15 parts by weight of aqueous formaldehyde (E) (concentration: 35 wt %, mole ratio: E/D=1.8) and 5 parts by weight of aqueous sodium hydroxide (concentration: 10 wt %), followed by stirring these ingredients for 3 hours under heating at 80° C. After the stirring was stopped, the resultant mixture was cooled, blended with 370 parts by weight of aqueous sodium hydroxide (concentration: 1 wt %) and subjected to polymerization to yield the monohydroxybenzene-formaldehyde resin (A).

Aqueous ammonia and water were added into the yielded monohydroxybenzene-formaldehyde resin (A) together with commercially available emulsions of the vinylpyridine-styrene-butadiene copolymer (B) and the chlorosulfonated polyethylene (C), thereby obtaining the glass-fiber coating liquid of the present invention.

More specifically, the glass-fiber coating liquid of the present invention was prepared by mixing 42 parts by weight of the monohydroxybenzene-formaldehyde resin (A), 476 parts by weight of the emulsion of the vinylpyridine-styrene-butadiene copolymer (B) available under the trade name of Pyratex (vinylpyridine-styrene-butadiene weight ratio: 15:15:70, solid matter content: 41.0 wt %) from Nippon A&L Inc., 206 parts by weight of the emulsion of the chlorosulfonated polyethylene (C) available under the trade name of CSM450 (solid matter content: 40.0 wt %) from Sumitomo Seika Chemicals Co., Ltd. and 22 parts by weight of aqueous ammonia (concentration: 25.0 wt %) as the PH adjuster with water based on 100 parts by weight of the total of these components.

The content percentages of the monohydroxybenzene-formaldehyde resin (A), the vinylpyridine-styrene-butadiene copolymer (B) and the chlorosulfonated polyethylene (C) in the glass-fiber coating liquid were A/(A+B+C)=3.6%, B/(A+B+C)=67.8% and C/(A+B+C)=28.6%, respectively, based on 100% of the total weight of the monohydroxybenzene-formaldehyde resin (A), the vinylpyridine-styrene-butadiene copolymer (B) and the chlorosulfonated polyethylene (C). The weights of the vinylpyridine-styrene-butadiene copolymer (B) and the chlorosulfonated polyethylene (C) were determined by conversion of the solid matter contents of Pyratex and CSM450 into the weight units.

(Production of Rubber-Reinforcing Glass Fiber of the Invention)

The secondary glass-fiber coating liquid was next prepared by mixing and dispersing a chlorosulfonated polyethylene (C), p-dinitrosobenzene, hexamethylene diallylnagiimide as the bis-allylnagiimide (H) and carbon black into xylene to form the secondary coating layer on the rubber-reinforcing glass fiber according to the present invention.

More specifically, 100 parts by weight of the chlorosulfonated polyethylene (C) available as the halogen-containing polymer (G) under the trade name of TS-430 from Tosoh Corporation, 40 parts by weight of p-dinitrosobenzene, 0.3 parts by weight of N-N=-hexamethylene diallylnagiimide available under the trade name of BANI-H from Maruzen Petrochemical Co., Ltd. and 30 parts by weight of carbon black were mixed together, followed by dispersing the resultant mixture into 1315 parts by weight of xylene to obtain the secondary glass-fiber coating liquid. The contents percentages of N-N=-hexamethylene diallylnagiimide as the bis-allylnagiimide (H), p-dinitrosobenzene as the vulcanization agent (L) and carbon black as the inorganic filler (N) in the secondary glass-fiber coating liquid were H/G=0.3 wt %, L/G=40 wt % and N/G=30 wt %, respectively, based on the weight of the chlorosulfonated polyethylene (C).

Three glass fiber cords, each of which had 200 glass fiber filaments of 9 µm in diameter, were aligned with one another. The above-prepared glass-fiber coating liquid was applied to the glass fiber cords and dried for 22 seconds at a temperature of 280° C. to form the primary coating layer on the glass fiber cords.

The solid matter adhesion rate, i.e., the weight percentage of the coating layer was 19.0 wt % based on the total weight of the primary coated glass fiber cords.

The coated glass fiber cords were then subjected to two times of initial twist per 2.54 cm in one direction to provide a strand of the coated glass fiber cords. Thirteen strands of the coated glass fiber cords were provided in total and subjected to two times of final twist per 2.54 cm in the opposite direction. The above-prepared secondary glass-fiber coating liquid was applied to the stranded glass fiber cords and dried for 1 minute at a temperature of 110° C. to form the secondary coating layer on the glass fiber cords. In this way, two types of the rubber-reinforcing glass fibers having opposite initial and final twist directions (referred to S-twist and Z-twist fibers) were produced.

The solid matter adhesion rate, i.e., the weight percentage of the secondary coating layer was 3.5 wt % based on the total weight of the primary and secondary coated glass fiber cords.

Example 2

The glass-fiber coating liquid of the present invention was prepared in the same manner as in Example 1, except for containing 83 parts by weight of the monohydroxybenzene-formaldehyde resin (A) and 451 parts by weight of the emulsion of the vinylpyridine-styrene-butadiene copolymer (B) available under the trade name of Pyratex (vinylpyridine-styrene-butadiene weight ratio: 15:15:70, solid matter content: 41.0 wt %) from Nippon A&L Inc. The contents of the monohydroxybenzene-formaldehyde resin (A), the vinylpyridine-styrene-butadiene copolymer (B) and the chlorosulfonated polyethylene (C) in the glass-fiber coating liquid were A/(A+B+C)=7.2%, B/(A+B+C)=64.2% and C/(A+B+C)=28.6%, respectively, based on 100% of the total weight of the monohydroxybenzene-formaldehyde resin (A), the vinylpyridine-styrene-butadiene copolymer (B) and the chlorosulfonated polyethylene (C).

The secondary glass-fiber coating liquid was prepared in the same manner as in Example 1. The rubber-reinforcing glass fibers (Example 2) were then produced by applying the primary and secondary coating layers onto the glass fiber cords in the same manner as in Example 1.

Example 3

The glass-fiber coating liquid of the present invention was prepared in the same manner as in Example 1, except for containing 124 parts by weight of the monohydroxybenzene-formaldehyde resin (A) and 426 parts by weight of the emulsion of the vinylpyridine-styrene-butadiene copolymer (B) available under the trade name of Pyratex (vinylpyridine-styrene-butadiene weight ratio: 15:15:70, solid matter content: 41.0 wt %) from Nippon A&L Inc. The contents of the monohydroxybenzene-formaldehyde resin (A), the vinylpyridine-styrene-butadiene copolymer (B) and the chlorosulfonated polyethylene (C) in the glass-fiber coating liquid were A/(A+B+C)=10.8%, B/(A+B+C)=60.6% and C/(A+B+C)=28.6%, respectively, based on 100% of the total weight of the monohydroxybenzene-formaldehyde resin (A), the vinylpyridine-styrene-butadiene copolymer (B) and the chlorosulfonated polyethylene (C).

The secondary glass-fiber coating liquid was prepared in the same manner as in Example 1. The rubber-reinforcing glass fibers (Example 3) were then produced by following the same manner as in Example 1 to apply the primary and secondary coating layers onto the glass fiber cords.

Example 4

As the monohydroxybenzene-formaldehyde resin (A), a monohydroxybenzene-formaldehyde resin available under the trade name of Resitop PL-4667 (solid matter content: 41 wt %) from Gun Ei Chemical Industry Co., Ltd. was diluted with to two weight parts of aqueous sodium hydroxide (concentration: 1 wt %).

The glass-fiber coating liquid of the present invention was prepared in the same manner as in Example 1, except for containing 83 parts by weight of the above diluent of Resitop as the monohydroxybenzene-formaldehyde resin (A) and 451 parts by weight of the emulsion of the vinylpyridine-styrene-butadiene copolymer (B) available under the trade name of Pyratex (vinylpyridine-styrene-butadiene weight ratio: 15:15:70, solid matter content: 41.0 wt %) from Nippon A&L Inc. The contents of the monohydroxybenzene-formaldehyde resin (A), the vinylpyridine-styrene-butadiene copolymer (B) and the chlorosulfonated polyethylene (C) in the glass-fiber coating liquid were A/(A+B+C)=7.2%, B/(A+B+C)=64.2% and C/(A+B+C)=28.6%, respectively, based on 100% of the total weight of the monohydroxybenzene-formaldehyde resin (A), the vinylpyridine-styrene-butadiene copolymer (B) and the chlorosulfonated polyethylene (C).

The secondary glass-fiber coating liquid was prepared in the same manner as in Example 1. The rubber-reinforcing glass fibers (Example 4) were then produced by applying the primary and secondary coating layers onto the glass fiber cords in the same manner as in Example 1.

Example 5

The same glass-fiber coating liquid as in Example 2 was prepared. The prepared glass-fiber coating liquid was applied to form the coating layer on the glass fiber cords in the same manner as in Example 1.

The secondary glass-fiber coating liquid was prepared by mixing 100 parts by weight of chlorosulfonated polyethylene available as the halogen-containing polymer (G) under the trade name of TS-430 from Tosoh Corporation, 40 parts by weight of p-dinitrosobenzene, 25 parts by weight of hexamethylene diisocyanate as the organic diisocyanate (J), 3.0 parts by weight of the zinc methacrylate (I) and 30 parts by weight of carbon black, and then, dispersing the resultant mixture into 1315 parts by weight of xylene. The contents percentages of hexamethylene diisocyanate, zinc methacrylate (I) and carbon black as the inorganic filler (N) in the secondary glass-fiber coating liquid were J/G=25.0 wt %, I/G=3.0 wt % and N/G=30 wt %, respectively, based on the weight of the chlorosulfonated polyethylene. Then, the rubber-reinforcing glass fibers (Example 5) were produced by applying the secondary coating layer onto the above coated glass fiber cords according to the same procedure as in Example 1.

Example 6

The same glass-fiber coating liquid as in Example 2 was prepared. The prepared glass-fiber coating liquid was applied to form the coating layer on the glass fiber cords in the same manner as in Example 1.

The secondary glass-fiber coating liquid was prepared by mixing 100 parts by weight of chlorosulfonated polyethylene available as the halogen-containing polymer (G) under the trade name of TS-430 from Tosoh Corporation, 40 parts by weight of p-dinitrosobenzene and N,N-m-phenylene di-maleimide as the maleimide (K) in an amount of K/G=50 wt % and 30 parts by weight of carbon black, and then, dispersing the resultant mixture into 1315 parts by weight of xylene. The content percentages of N,N-m-phenylene di-maleimide as the maleimide (K), p-dinitrosobenzene as the vulcanization agent (L) and carbon black as the inorganic filler (N) in the secondary glass-fiber coating liquid were K/G=50.0 wt %, L/G=3.0 wt % and N/G=30.0 wt %, respectively, based on the weight of the chlorosulfonated polyethylene. Then, the rubber-reinforcing glass fiber (Example 6) was produced by applying the secondary coating layer onto the above coated glass fiber cords according to the same procedure as in Example 1.

Example 7

The same glass-fiber coating liquid as in Example 2 was prepared. The prepared glass-fiber coating liquid was applied to form the coating layer on the glass fiber cords in the same manner as in Example 1.

The secondary glass-fiber coating liquid was prepared by mixing 100 parts by weight of chlorosulfonated polyethylene available as the halogen-containing polymer (G) under the trade name of TS-430 from Tosoh Corporation, 40 parts by weight of p-dinitrosobenzene, triallyl cyanurate as the triazine compound (M) in an amount of M/G=2.0 wt % and 30 parts by weight of carbon black, and then, dispersing the resultant mixture into 1315 parts by weight of xylene. The content percentages of p-dinitrosobenzene as the vulcanization agent L, triallyl cyanurate as the triazine compound M and carbon black as the inorganic filler N in the secondary glass-fiber coating liquid were L/G=40.0 wt %, M/G=2.0 wt % and N/G=30.0 wt %, respectively, based on the weight of the chlorosulfonated polyethylene. Then, the rubber-reinforcing glass fibers (Example 7) were produced by applying the secondary coating layer onto the above coated glass fiber cords according to the same procedure as in Example 1.

Example 8

The same glass-fiber coating liquid as in Example 2 was prepared. The prepared glass-fiber coating liquid was applied to form the coating layer on the glass fiber cords in the same manner as in Example 1.

The secondary glass-fiber coating liquid was prepared by mixing 100 parts by weight of chlorosulfonated polyethylene available as the halogen-containing polymer (G) under the trade name of TS-430 from Tosoh Corporation, 40 parts by weight of p-dinitrosobenzene, triallyl isocyanurate as the triazine compound (M) in an amount of M/G=2.0 wt % and 30 parts by weight of carbon black, and then, dispersing the resultant mixture into 1315 parts by weight of xylene. The content percentages of p-dinitrosobenzene as the vulcanization agent (L), triallyl isocyanurate as the triazine compound (M) and carbon black as the inorganic filler (N) in the secondary glass-fiber coating liquid were L/G=40.0 wt %, M/G=2.0 wt % and N/G=30.0 wt %, respectively, based on the weight of the chlorosulfonated polyethylene. Then, the rubber-reinforcing glass fiber (Example 8) was produced by applying the secondary coating layer onto the above coated glass fiber cords according to the same procedure as in Example 1.

Comparative Example 1

A conventional rubber-reinforcing glass fiber coating liquid of resorcinol-formaldehyde resin, vinylpyridine-stylene-butadiene copolymer emulsion and chlorosulfonated polyethylene was prepared.

More specifically, the rubber-reinforcing glass fiber coating liquid was prepared in the same manner as in Example 1, except for containing 239 parts by weight of a resorcinol-formaldehyde resin (resorcinol-formaldehyde mole ratio: 1.0:1.0, solid matter content: 8.7 wt %) in place of the monohydroxybenzene-formaldehyde resin (A) and 451 parts by weight of the vinylpyridine-stylene-butadiene emulsion available under the trade name of Pyratex (vinylpyridine-stylene-butadiene weight ratio: 15:15:70, solid matter content: 41.0 wt %) from Nippon A&L Inc. The contents of the resorcinol-formaldehyde resin (A), the vinylpyridine-stylene-butadiene copolymer (B) and the chlorosulfonated polyethylene (C) in the glass-fiber coating liquid were A/(A+B+C)=7.2%, B/(A+B+C)=64.2% and C/(A+B+C)=28.6%, respectively, based on 100% of the total weight of the resorcinol-formaldehyde resin (A), the vinylpyridine-stylene-butadiene copolymer (B) and the chlorosulfonated polyethylene (C).

The secondary glass-fiber coating liquid was prepared in the same manner as in Example 1. The rubber-reinforcing glass fibers (Comparative Example 1) were then produced by applying the primary and secondary coating layers onto the glass fiber cords in the same manner as in Example 1.

Comparative Example 2

The same glass-fiber coating liquid as in Comparative Example 1 was prepared. The secondary glass-fiber coating liquid was prepared in the same manner as in Example 1 using 100 parts by weight of chlorosulfonated polyethylene available under the trade name of TS-430 from Tosoh Corporation, 40 parts by weight of 4,4=-diphenylmethane diisocyanate, 30 parts by weight of carbon black and 1315 parts by weight of xylene. Then, the rubber-reinforcing glass fibers (Comparative Example 2) were produced by applying the primary and secondary coating layers onto the glass fiber cords according to the same procedure as in Comparative Example 1. The contents of 4,4=-diphenylmethane diisocyanate and carbon black in the secondary glass-fiber coating liquid were 40.0 wt and 30.0 wt %, respectively, based on the weight of the chlorosulfonated polyethylene.

Comparative Example 3

The same glass-fiber coating liquid as in Example 2 was prepared. The same secondary glass-fiber coating liquid as in Comparative Example 2 was prepared. Then, the rubber-reinforcing glass fibers (Comparative Example 3) were produced by applying the primary and secondary coating layers onto the glass fiber cords according to the same procedure as in Example 1.

(Adhesion Strength Evaluation Test)

Before addressing the procedure of the adhesion strength evaluation test, an explanation will be given to heat-resistant rubber materials used in the test.

The heat-resistant rubber materials used in the adhesion strength evaluation test were a heat-resistant cross-linked HNBR rubber (hereinafter referred to as heat-resistant rubber A) prepared from 100 parts by weight of HNBR (available under the product number of 2020 from Zeon Corporation) as a base rubber, 40 parts by weight of carbon black, 5 parts by weight of hydrozincite, 0.5 parts by weight of stearic acid, 0.4 parts by weight of sulfur, 2.5 parts by weight of a vulcanization accelerator and 1.5 parts by weight of an antioxidant and a heat-resistant rubber (hereinafter referred to as heat-resistant rubber B) prepared from 100 parts by weight of HNBR (available under the product number of 2010 from Zeon Corporation) as a base rubber, 40 parts by weight of carbon black, 5 parts by weight of hydrozincite, 0.5 parts by weight of stearic acid, 5 parts by weight of 1,3-di(t-buthylperoxyisopropyl)benzene and 1.5 parts by weight of an antioxidant.

The heat-resistant rubbers A and B were formed into sheets of 3 mm thickness and 25 mm width. Twenty pieces of the rubber-reinforcing glass fiber cords (Examples 1-4 and Comparative Examples 1-3) were placed on each of the sheets of the heat-resistant rubbers A and B and covered with cloths, followed by pressing the rubber sheets except their edges with 196 Newton/cm$^2$ of pressure (hereinafter the term "Newton" is abbreviated as N) at a temperature of 150° C. in the case of the heat-resistant rubber A and with 196 N/cm$^2$ of pressure at a temperature of 170° C. in the case of the heat-resistant rubber B. In this way, the rubber sheets were subjected to vulcanization forming for 30 minute and completed as the test samples for the adhesion strength evaluation test. The adhesion strength of each of the test samples was evaluated by clamping the edge of the test sample and the rubber-reinforcing glass fiber independently, peeling the rubber-reinforcing glass fiber from the rubber sheet at a peel speed of 50 mm/min and determining the maximum resistance of the rubber-reinforcing glass fiber to peeling from the rubber sheet. Herein, higher peel strength means better adhesion strength.

(Adhesion Strength Evaluation Result)

The results of the adhesion strength evaluation test are indicated in TABLE 1.

TABLE 1

| | Adhesion Properties | | | |
|---|---|---|---|---|
| | Heat-resistant Rubber A | | Heat-resistant Rubber B | |
| | Peel Strength (N) | Peeling Condition | Peel Strength (N) | Peeling Condition |
| Example 1 | 314 | rubber fracture | 284 | rubber fracture |
| Example 2 | 333 | rubber fracture | 304 | rubber fracture |
| Example 3 | 323 | rubber fracture | 309 | rubber fracture |
| Example 4 | 343 | rubber fracture | 345 | rubber fracture |
| Example 5 | 313 | rubber fracture | 305 | rubber fracture |
| Example 6 | 325 | rubber fracture | 312 | rubber fracture |
| Example 7 | 333 | rubber fracture | 352 | rubber fracture |
| Example 8 | 314 | rubber fracture | 323 | rubber fracture |
| Comparative Example 1 | 323 | rubber fracture | 314 | rubber fracture |
| Comparative Example 2 | 294 | rubber fracture | 127 | interface fracture |
| Comparative Example 3 | 319 | rubber fracture | 118 | interface fracture |

In TABLE 1, the fracture condition of the test sample under which there was no interfacial separation between the glass fiber and the rubber is referred to as "rubber fracture" and the fracture condition of the test sample under which there was separation in at least part of the interface between the glass fiber and the rubber is referred to as "interface fracture". The occurrence of rubber fracture means higher adhesion strength than the occurrence of interfacial fracture.

As indicated in TABLE 1, the rubber-reinforcing glass fiber of Example 1 according to the present invention had a peel strength of 314 N against the heat-resistant rubber A and 284 N against the heat-resistant rubber B and thus was proven to show good adhesion to both of these rubber materials.

The rubber-reinforcing glass fiber of Example 2 according to the present invention had a peel strength of 333 N against the heat-resistant rubber A and 304 N against the heat-resistant rubber B as indicated in TABLE 1 and thus was proven to show good adhesion to both of these rubber materials.

The rubber-reinforcing glass fiber of Example 3 according to the present invention had a peel strength of 323 N against the heat-resistant rubber A and 309 N against the heat-resistant rubber B as indicated in TABLE 1 and thus was proven to show good adhesion to both of these rubber materials.

The rubber-reinforcing glass fiber of Example 4 according to the present invention had a peel strength of 343 N against the heat-resistant rubber A and 345 N against the heat-resistant rubber B as indicated in TABLE 1 and thus was proven to show good adhesion to both of these rubber materials.

The rubber-reinforcing glass fiber of Example 5 according to the present invention had a peel strength of 313 N against the heat-resistant rubber A and 305 N against the heat-resistant rubber B as indicated in TABLE 1 and thus was proven to show good adhesion to both of these rubber materials.

The rubber-reinforcing glass fiber of Example 6 according to the present invention had a peel strength of 325 N against the heat-resistant rubber A and 312 N against the heat-resistant rubber B as indicated in TABLE 1 and thus was proven to show good adhesion to both of these rubber materials.

The rubber-reinforcing glass fiber of Example 7 according to the present invention had a peel strength of 333 N against the heat-resistant rubber A and 352 N against the heat-resistant rubber B as indicated in TABLE 1 and thus was proven to show good adhesion to both of these rubber materials.

The rubber-reinforcing glass fiber of Example 8 according to the present invention had a peel strength of 314 N against the heat-resistant rubber A and 323 N against the heat-resistant rubber B as indicated in TABLE 1 and thus was proven to show good adhesion to both of these rubber materials.

Further, the fracture conditions of the rubber-reinforcing glass fibers of Examples 1-8 according to the present invention were determined as rubber fracture in both of the cases of the heat-resistant rubber A and the heat-resistant rubber B as indicated in TABLE 1. The rubber-reinforcing glass fibers of Examples 1-8 were thus also proven to show good adhesion to these rubber materials.

The rubber-reinforcing glass fibers of Comparative Example 1, departing from the scope of the present invention, were formed into test samples and subjected to adhesion strength evaluation test in the same manner as in Example 1. The peel strength of the rubber-reinforcing glass fiber of Comparative Example 1 was 323 N against the heat-resistant rubber A and 314 N against the heat-resistant rubber B as indicated in TABLE 1. The rubber-reinforcing glass fiber of Comparative Example 1 was thus proven to show good adhesion to both of these rubber materials. Further, the fracture condition of the test sample of Comparative Example 1 was determined as rubber fracture in either of the cases of the heat-resistant rubber A and the heat-resistant rubber B as indicated in TABLE 1. The rubber-reinforcing glass fiber of Comparative Example 1 was thus also proven to show good adhesion to these rubber materials.

The rubber-reinforcing glass fibers of Comparative Example 2, departing from the scope of the present invention, were formed into test samples and subjected to adhesion strength evaluation test in the same manner as in Example 1. The peel strength of the rubber-reinforcing glass fiber of Comparative Example 2 was 294 N against the heat-resistant rubber A and 127 N against the heat-resistant rubber B as indicated in TABLE 1. The rubber-reinforcing glass fiber of Comparative Example 2 was proven to show good adhesion to the heat-resistant rubber A but poor adhesion to the heat-resistant rubber B.

The rubber-reinforcing glass fibers of Comparative Example 3, departing from the scope of the present invention, were formed into test samples and subjected to adhesion strength evaluation test in the same manner as in Example 1. The peel strength of the rubber-reinforcing glass fiber of Comparative Example 3 was 319 N against the heat-resistant rubber A and 118 N against the heat-resistant rubber B as indicated in TABLE 1. The rubber-reinforcing glass fiber of Comparative Example 3 was proven to show good adhesion to the heat-resistant rubber A but poor adhesion to the heat-resistant rubber B.

(Water Resistant Evaluations)

The transmission belts ware produced with a width of 19 mm and a length of 876 mm using the rubber-reinforcing glass fibers of Examples 1, 2 and 4-8 and Comparative Examples 1-3 as the reinforcements and the heat-resistant rubber B as the base rubber material and subjected to water-resistance running fatigue test for water resistance evaluations. The water resistance of the transmission belt was evaluated in terms of the tensile strength maintenance, i.e., the water-resistance running fatigue as measured after running the transmission belt on gearwheels i.e. pulleys under wet conditions for a predetermined time.

FIG. 1 is a perspective sectional view of the transmission belts produced by embedding the rubber-reinforcing glass fibers in the heat-resistant rubbers.

The transmission belt 1 had a plurality of projections 1A of 3.2 mm height for engagement with the pulleys, a base portion 1B of 2.0 mm thickness excluding the height of the projections 1A and twelve rubber-reinforcing glass fibers (rubber-reinforcing glass fiber cords) 2 with six S-twist fibers and six Z-twist fibers of opposite initial and final twist directions embedded alternately in the base portion 1B as shown by the section of FIG. 1.

Figure 2:
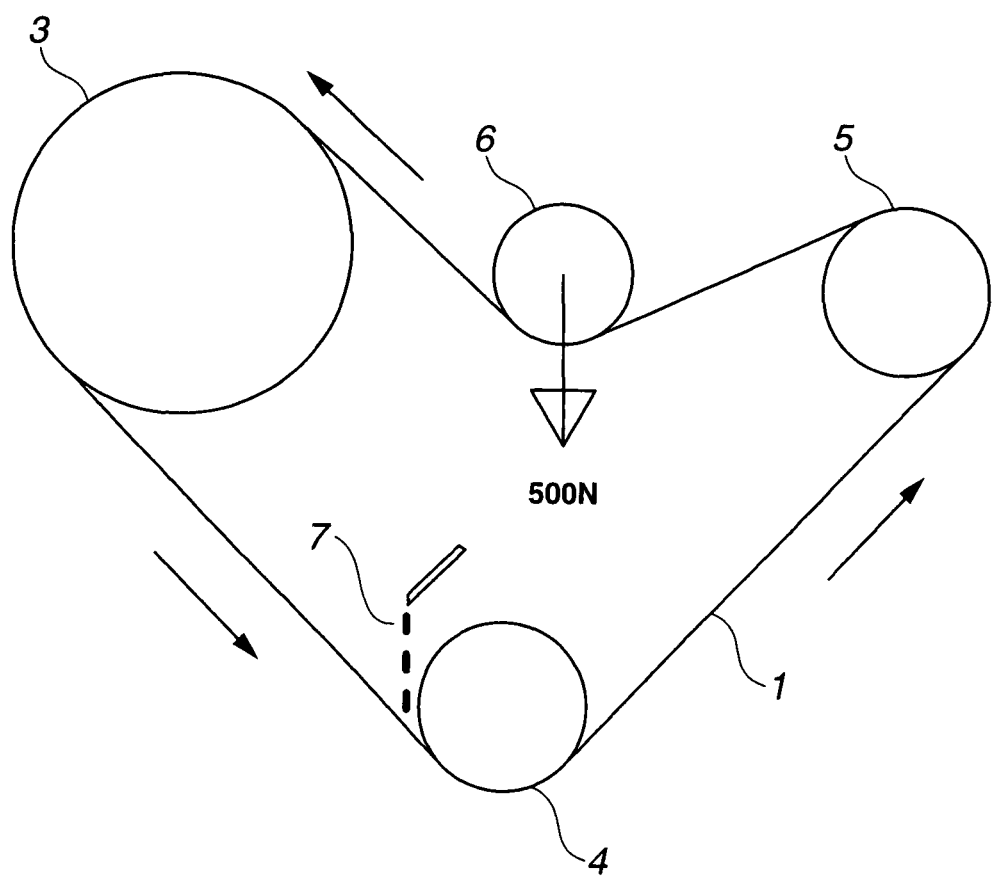
FIG. 2 is a schematic view of a water-resistance running fatigue tester for the transmission belt.

FIG. 2 is a schematic view of a water-resistance running fatigue tester for the transmission belts.

The belt water resistance was tested by setting the transmission belt 1 in the water-resistance running fatigue tester as shown in FIG. 2 with a drive motor and a generator (not shown in the drawings).

The drive pulley 3 was connected to and rotated by the drive motor to run the transmission belt 1 with rotation of the driven pulleys 4 and 5. The driven pulley 5 was connected to the generator (not shown) to drive the generator in such a manner as to produce 1 kw of power. The idler 6 was rotated during the water-resistance running fatigue test to apply a load of 500 N to the transmission belt 1 and thereby hold the transmission belt 1 under tension. The drive pulley 3 had a diameter of 120 mm and 40 teeth (T), whereas the driven pulleys 4 and 5 had a diameter of 60 mm and 20 teeth (T). The rotation rate of the drive pulley 3 per minute in the water-resistance running fatigue test was 3000 rpm, and the rotation rate of the driven pulleys 4 and 5 per minute in the water-resistance running fatigue test was 6000 rpm. Herein, arrows in parallel with the transmission belt 1 in the drawing indicate the belt running direction.

As shown in FIG. 2, the transmission belt 1 was run with the driven pulleys 4 and 5 and the idler 6 at room temperature by rotating the drive pulley 3 at 3000 rpm and dropping 6000 ml of water 7 per hour uniformly onto the transmission belt 1 at a location between the drive pulley 3 and the driven pulley 4. In the water-resistance running fatigue test, the transmission belt 1 was run for 36 hours as explained above. The tensile strength of the transmission belt 1 was measured before and after the water-resistance running fatigue test to determine the tensile strength maintenance of the transmission belt 1 before and after the test according to the following mathematical expression 1. The water resistance of the transmission belts 1 provided with the rubber-reinforcing glass fibers 2 of Examples 1, 2, 4-8 and Comparative Examples 1-3 were compared and evaluated based on the test results.

(Tensile Strength Measurements)

For tensile strength measurements, three test samples of 257 mm length were cut from a single transmission belt. Each of the test samples was held at its edges by clamps with a clamp-to-clamp distance of 145 mm and pulled at 50 mm/min, thereby measuring the maximum resistance of the belt to breaking. The resistance was measured three times on each belt. The average of the measured resistance values was determined as the tensile strength of the transmission belt after the test. The tensile strength of the transmission belt before the test was determined by measuring the belt resistance three times on each of ten belts and setting the initial tensile strength value to the average of the measured resistance values.

$$\text{Tensile Strength maintenance (\%)} = (\text{Tensile Strength after Test}) \div (\text{Tensile Strength before Test}) \times 100 \qquad \text{[Math. 1]}$$

The tensile strength maintenance of each of the transmission belts after the water-resistance running fatigue test is indicated in TABLE 2.

TABLE 2

| | Tensile Strength Maintenance (%) |
|---|---|
| Example 1 | 56 |
| Example 2 | 61 |
| Example 4 | 63 |
| Example 5 | 58 |
| Example 6 | 59 |
| Example 7 | 63 |
| Example 8 | 54 |
| Comparative Example 1 | 47 |
| Comparative Example 2 | 39 |
| Comparative Example 3 | 51 |

As indicated in TABLE 2, the tensile strength maintenance of the transmission belt 1 using the rubber-reinforcing glass fibers 2 of each of Example 1, 2, 4-8 and Comparative Example 3, with the coating layer of the glass-fiber coating liquid composition of the monohydroxybenzene-formaldehyde resin, the vinylpyridine-styrene-butadiene copolymer and the chlorosulfonated polyethylene and the secondary coating layer, measured after the belt running test was 56% in Example 1; 61% in Example 2; 63% in Example 4; 58% in Example 5; 59% in Example 6; 63% in Example 7; 54% in Example 8; and 51% in Comparative Example 3.

By contrast, the tensile strength maintenance of the transmission belt 1 using the rubber-reinforcing glass fibers 2 of each of Comparative Example 1 and 2 with the coating layer of the glass-fiber coating liquid composition of the resorcinol-formaldehyde resin as the alternative to the monohydroxybenzene-formaldehyde resin, the vinylpyridine-styrene-butadiene copolymer and the chlorosulfonated polyethylene and the secondary coating layer was 47% in Comparative Example 1; and 39% in Comparative Example 2. The transmission belts 1 having the rubber-reinforcing glass fibers 2 of Comparative Example 1 and 2 were thus poor in water resistance. In particular, the tensile strength maintenance of the transmission belt 1 was 61% in the case of using the rubber-reinforcing glass fibers 2 of Example 2 and much greater than the tensile strength maintenance of the transmission belt 1 of 51% in the case of using the rubber-reinforcing glass fibers 2 of Comparative Example 3.

As is apparent from the above water-resistance running fatigue test results, the transmission belt 1 had higher water resistance in the case of using the rubber-reinforcing glass fibers 2 of the present invention provided with the coating layer of the glass-fiber coating liquid composition of the monohydroxybenzene-formaldehyde resin (A), the vinylpyridine-styrene-butadiene copolymer (B) and the chlorosulfonated polyethylene (C) and the secondary coating layer of the composition of N-N═-hexamethylene diallylnagiimide as the bis-allylnagiimide (H), chlorosulfonated polyethylene as the halogen-containing polymer (G) and p-dinitrosobenzene, than in the case of using the conventional rubber-reinforcing glass fibers 2.

As is also apparent from the water-resistance running fatigue test results, the transmission belt 1 had higher water resistance in the case of using the rubber-reinforcing glass fibers 2 of the present invention provided with the coating layer of the glass-fiber coating liquid composition of the monohydroxybenzene-formaldehyde resin (A), the vinylpyridine-styrene-butadiene copolymer (B) and the chlorosulfonated polyethylene (C) and the secondary coating layer of the composition of the zinc methacrylate (I), hexamethylene diisocyanate as the organic diisocyanate (J), chlorosulfonated polyethylene as the halogen-containing polymer (G) and p-dinitrosobenzene, than in the case of using the conventional rubber-reinforcing glass fibers 2.

As is apparent from the water-resistance running fatigue test results, the transmission belt 1 had higher water resistance in the case of using the rubber-reinforcing glass fibers 2 of the present invention provided with the coating layer of the glass-fiber coating liquid composition of the monohydroxybenzene-formaldehyde resin (A), the vinylpyridine-styrene-butadiene copolymer (B) and the chlorosulfonated polyethylene (C) and the secondary coating layer of the composition of phenylene di-maleimide as the maleimide (K), chlorosulfonated polyethylene as the halogen-containing polymer (G) and p-dinitrosobenzene, than in the case of using the conventional rubber-reinforcing glass fibers 2.

As is further apparent from the water-resistance running fatigue test results, the transmission belt 1 had higher water resistance in the case of using the rubber-reinforcing glass fibers 2 of the present invention provided with the coating layer of the glass-fiber coating liquid composition of the monohydroxybenzene-formaldehyde resin (A), the vinylpyridine-styrene-butadiene copolymer (B) and the chlorosulfonated polyethylene (C) and the secondary coating layer of the composition of triallyl cyanurate as the triazine compound (M), chlorosulfonated polyethylene as the halogen-containing polymer (G) and p-dinitrosobenzene, than in the case of using the conventional rubber-reinforcing glass fibers 2.

(Heat Resistance Evaluations)

The transmission belts was produced with a width of 19 mm and a length of 876 mm using the rubber-reinforcing glass fibers of Examples 2 and 4-8 and Comparative Examples 1 and 2 as the reinforcements and the heat-resistant rubber B as the base rubber material and were then subjected to heat-resistance and flexion-resistance running fatigue test for heat resistance evaluations. The heat resistance of the transmission belt was evaluated in terms of the tensile strength maintenance, i.e., the water-resistance running fatigue as measured after running the transmission belt on gearwheels i.e. pulleys under high-temperature conditions for a predetermined time.

Figure 3:
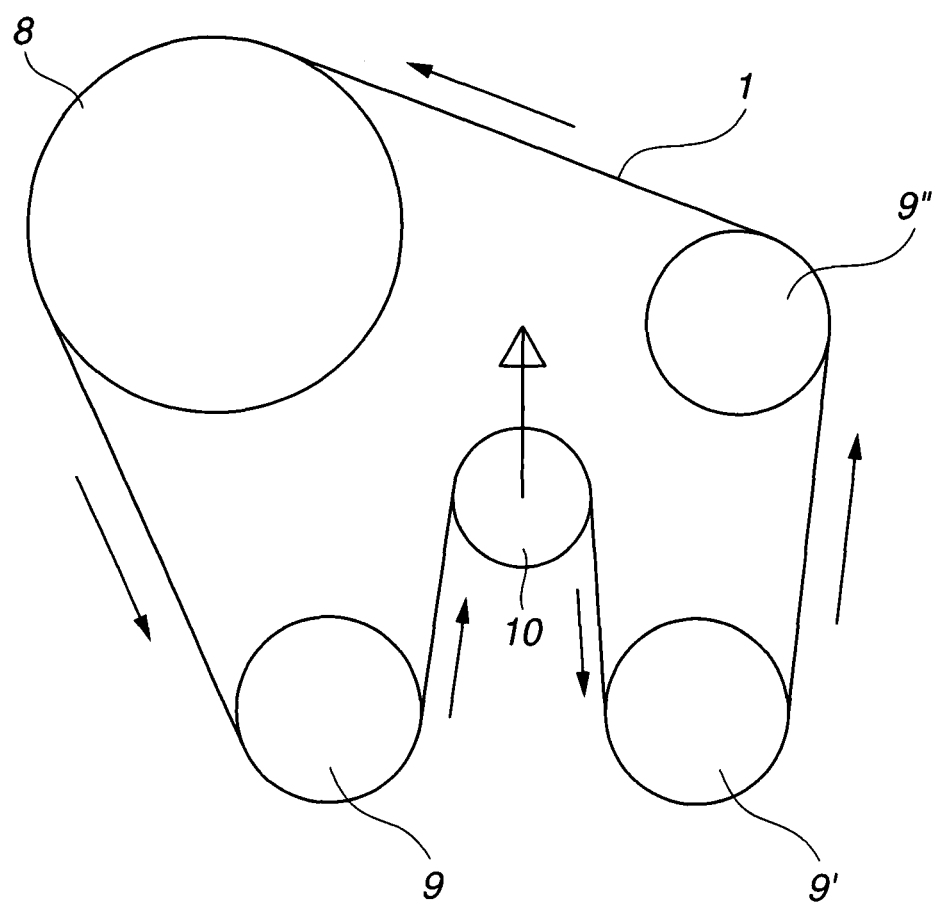
FIG. 3 is a schematic view of a heat-resistance and flexion-resistance running fatigue tester for the transmission belt.

FIG. 3 is a schematic view of a heat-resistance and flexion-resistance running fatigue tester for the transmission belts.

The belt heat resistance was tested by setting the transmission belt 1 in the heat-resistance and flexion-resistance running fatigue tester as shown in FIG. 3 with a drive motor (not shown in the drawing). The drive pulley 8 was rotated by the drive motor to run the transmission belt 1 with rotation of three driven pulleys 9, 9' and 9". The idler 10 was rotated during the heat-resistance and flexion-resistance running fatigue test to apply a load of 500 N to the transmission belt 1 and thereby hold the transmission belt 1 under tension. The drive pulley 8 had a diameter of 120 mm and 40 teeth (T), whereas the driven pulleys 9, 9' and 9" had a diameter of 60 mm and 20 teeth (T). The rotation rate of the drive pulley 8 per minute in the heat-resistance and flexion-resistance running fatigue test was 3000 rpm, and the rotation rate of the driven pulleys 9, 9' and 9" per minute in the heat-resistance and flexion-resistance running fatigue test was 6000 rpm. Arrows in parallel with the transmission belt 1 in the drawing indicate the belt running direction.

As shown in FIG. 3, the transmission belt 1 was run at a temperature of 130° C. by rotating the drive pulley 8 at 3000 rpm and bending the belt 1 with the driven pulleys 9, 9' and 9" and the idler 10. In the heat-resistance and flexion-resistance running fatigue test, the transmission belt 1 was run for 500 hours as explained above. The tensile strength of the transmission belt 1 was measured before and after the heat-resistance and flexion-resistance running fatigue test to determine the tensile strength maintenance of the transmission belt 1 before and after the test according to the mathematical expression 1. The heat resistance of the transmission belts 1 provided with the rubber-reinforcing glass fibers 2 of Examples 2, 4-8 and Comparative Examples 1-2 were compared and evaluated based on the test results.

The tensile strength maintenance of each of the transmission belts after the heat-resistance and flexion-resistance running fatigue test is indicated in TABLE 3.

TABLE 3

|  | Tensile Strength Maintenance (%) |
| --- | --- |
| Example 2 | 91 |
| Example 4 | 93 |
| Example 5 | 95 |
| Example 6 | 92 |
| Example 7 | 92 |
| Example 8 | 93 |
| Comparative Example 1 | 90 |
| Comparative Example 2 | 80 |

As indicated in TABLE 3, the tensile strength maintenance of the transmission belts 1 using the rubber-reinforcing glass fibers 2 of Example 2 and 4-8 was measured to be 91%, 93%, 95%, 92%, 92% and 93%, respectively, after the heat-resistance and flexion-resistance running fatigue test and much greater than those values of 90% and 80% of Comparative Examples 1 and 2. The belt heat resistance of Example 2 and 4-8 was thus higher than that of Comparative Examples 1 and 2.

As is apparent from the above heat-resistance and flexion-resistance running fatigue test results, the transmission belt 1 had high heat resistance in the case of using the rubber-reinforcing glass fibers 2 of the present invention provided with the coating layer of the glass-fiber coating liquid composition of the monohydroxybenzene-formaldehyde resin (A), the vinylpyridine-stylene-butadiene copolymer (B) and the chlorosulfonated polyethylene (C) and the secondary coating layer of the composition of N-N=-hexamethylene diallylnagiimide as the bis-allylnagiimide (H), chlorosulfonated polyethylene as the halogen-containing polymer (G) and p-dinitrosobenzene.

As is also apparent from the heat-resistance and flexion-resistance running fatigue test results, the transmission belt 1 had high heat resistance in the case of using the rubber-reinforcing glass fibers 2 of the present invention provided with the coating layer of the glass-fiber coating liquid composition of the monohydroxybenzene-formaldehyde resin (A), the vinylpyridine-stylene-butadiene copolymer (B) and the chlorosulfonated polyethylene (C) and the secondary coating layer of the composition of the zinc methacrylate (I), hexamethylene diisocyanate as the organic diisocyanate (J), chlorosulfonated polyethylene as the halogen-containing polymer (G) and p-dinitrosobenzene.

As is apparent from the heat-resistance and flexion-resistance running fatigue test results, the transmission belt 1 had high heat resistance in the case of using the rubber-reinforcing glass fibers 2 of the present invention provided with the coating layer of the glass-fiber coating liquid composition of the monohydroxybenzene-formaldehyde resin (A), the vinylpyridine-stylene-butadiene copolymer (B) and the chlorosulfonated polyethylene (C) and the secondary coating layer of the composition of phenylene di-maleimide as the maleimide (K), chlorosulfonated polyethylene as the halogen-containing polymer (G) and p-dinitrosobenzene.

As is further apparent from the heat-resistance and flexion-resistance running fatigue test results, the transmission belt 1 had high heat resistance in the case of using the rubber-reinforcing glass fibers 2 of the present invention provided with the coating layer of the glass-fiber coating liquid composition of the monohydroxybenzene-formaldehyde resin (A), the vinylpyridine-stylene-butadiene copolymer (B) and the chlorosulfonated polyethylene (C) and the secondary coating layer of the composition of triallyl cyanurate as the triazine compound (M), chlorosulfonated polyethylene as the halogen-containing polymer (G) and p-dinitrosobenzene.

Particularly, the rubber-reinforcing glass fibers 2 of Examples 1-4 had good adhesion to the cross-liked HNBR material so as to impart high water and heat resistance to the transmission belt and were thus suitable as reinforcements in the automotive transmission belts such as timing belt used under high-temperature high-humidity conditions for a long time.

As described above, it is possible according to the present invention to obtain the glass-fiber coating liquid for forming the coating layer on the glass fiber cord so as to attain good adhesion strength between the glass fiber cord and the cross-linked HNBR base material so that the transmission belt, when produced by applying and drying the coating layer of this glass-fiber coating liquid onto the glass fiber and embedding the resulting rubber-reinforcing glass fiber in the cross-linked HNBR material can attain both of water resistance and heat resistance. Accordingly, the rubber-reinforcing glass fiber coated with the glass-fiber coating liquid of the present invention is usable as the reinforcement embedded in the power transmission belt for any power source e.g. engine and motor, notably embedded in the HNBR material of the automotive transmission belt such as timing belt so as to maintain tensile strength and impart dimension stability during use of the automotive transmission belt under high-temperature high-humidity conditions.

The invention claimed is:

1. A glass-fiber coating liquid for forming a coating layer on a glass fiber cord, the glass-fiber coating liquid being an emulsion consisting of:
    a monohydroxybenzene-formaldehyde resin (A) obtained by reaction of monohydroxybenzene (D) and formaldehyde (E);
    a vinylpyridine-styrene-butadiene copolymer (B);
    a chlorosulfonated polyethylene (C);
    at least one additive selected from the group consisting of an antioxidant, a pH adjuster and a stabilizer; and
    water.

2. The glass-fiber coating liquid according to claim 1, wherein the monohydroxybenzene-formaldehyde resin (A) is a resol resin obtained by reaction of the monohydroxybenzene (D) and the formaldehyde (E) in the presence of a base catalyst at a mole ratio of the formaldehyde (E) to the monohydroxybenzene (D) of E/D=0.5 to 3.0.

3. The glass-fiber coating liquid according to claim 2, wherein the monohydroxybenzene-formaldehyde resin (A), the vinylpyridine-styrene-butadiene copolymer (B) and the chlorosulfonated polyethylene (C) are contained in amounts of A/(A+B+C)=1.0 to 15.0% by weight, B/(A+B+C)=45.0 to 82.0% by weight and C/(A+B+C)=3.0 to 40.0% by weight, respectively.

4. A rubber-reinforcing glass fiber, comprising:
a glass fiber;
a coating layer formed by applying and drying the glass-fiber coating liquid according to claim 1 on the glass fiber; and
a secondary coating layer formed by applying a secondary glass-fiber coating liquid on said coating layer,
wherein the secondary glass-fiber coating liquid is prepared by dispersing a halogen-containing polymer (G) and a bis-allylnagiimide (H) in an amount of H/G=0.3 to 10% by weight into an organic solvent; and
wherein the halogen-containing polymer (G) is present in an amount of 10.0 to 70.0% by weight based on the weight of the secondary coating layer.

5. The rubber-reinforcing glass fiber according to claim 4, wherein the bis-allylnagiimide (H) is selected from the group consisting of N-N'-hexamethylene diallylnagiimide, N-N'-(m-xylylene) diallylnagiimide and N-N'-(4,4'-diphenylmethane) diallylnagiimide.

6. The rubber-reinforcing glass fiber according to claim 4, wherein the halogen-containing polymer is a chlorosulfonated polyethylene.

7. A transmission belt in which the rubber-reinforcing glass fiber according to claim 4 is embedded in a base rubber material.

8. An automotive timing belt in which the rubber-reinforcing glass fiber according to claim 4 is embedded in a hydrogenated nitrile rubber.

9. A rubber-reinforcing glass fiber, comprising:
a glass fiber;
a coating layer formed by applying and drying the glass-fiber coating liquid according to claim 1 on the glass fiber; and
a secondary coating layer formed by applying a secondary glass-fiber coating liquid on said coating layer,
wherein the secondary glass-fiber coating liquid is prepared by dispersing a halogen-containing polymer (G), zinc methacrylate (I) and an organic diisocyanate (J) in an amount of J/G=5.0 to 50.0% by weight into an organic solvent; and
wherein the halogen-containing polymer (G) is present in an amount of 10.0 to 70.0% by weight based on the weight of the secondary coating layer.

10. The rubber-reinforcing glass fiber according to claim 9, wherein the organic diisocyanate (J) is selected from the group consisting of hexamethylene diisocyanate, isophorone diisocyanate, methylene-bis(4-cyclohexylisocyanate), toluene diisocyanate, xylene diisocyanate, naphthalene diisocyanate, and methylene-bis(phenylisocyanate).

11. The rubber-reinforcing glass fiber according to claim 9, wherein the secondary glass-fiber coating liquid is prepared by dispersing the halogen-containing polymer (G), the organic diisocyanate (J) and the zinc methacrylate (I) in an amount of I/G=0.001% into the organic solvent; and wherein the halogen-containing polymer (G) is present in an amount of 10.0 to 70.0% by weight based on the weight of the secondary coating layer.

12. A transmission belt in which the rubber-reinforcing glass fiber according to claim 9 is embedded in a base rubber material.

13. An automotive timing belt in which the rubber-reinforcing glass fiber according to claim 9 is embedded in a hydrogenated nitrile rubber.

14. A rubber-reinforcing glass fiber, comprising:
a glass fiber;
a coating layer formed by applying and drying the glass-fiber coating liquid according to claim 1 on the glass fiber; and
a secondary coating layer formed by applying a secondary glass-fiber coating liquid on said coating layer,
wherein the secondary glass-fiber coating liquid is prepared by dispersing a halogen-containing polymer (G) and a maleimide (K) in an amount of K/G=20.0 to 90.0% by weight into an organic solvent; and
wherein the halogen-containing polymer (G) is present in an amount of 10.0 to 70.0% by weight based on the weight of the secondary coating layer.

15. The rubber-reinforcing glass fiber according to claim 14, wherein the maleimide (K) is selected from the group consisting of N,N-m-phenylene di-maleimide, 4,4'-diphenylmethane bis-maleimide, polyphenylmethane maleimide, m-phenylene bis-maleimide, 4-methyl-1,3-phenylene bis-maleimide, 4,4'-diphenylether bis-maleimide, 4,4'-diphenylsulfone bis-maleimide, chlorophenyl maleimide, methylphenyl maleimide, hydroxyphenyl maleimide, carboxyphenyl maleimide, dodecyl maleimide and cyclohexyl maleimide.

16. A transmission belt in which the rubber-reinforcing glass fiber according to claim 14 is embedded in a base rubber material.

17. An automotive timing belt in which the rubber-reinforcing glass fiber according to claim 14 is embedded in a hydrogenated nitrile rubber.

18. A rubber-reinforcing glass fiber, comprising:
a glass fiber;
a coating layer formed by applying and drying the glass-fiber coating liquid according to claim 1 on the glass fiber; and
a secondary coating layer formed by applying a secondary glass-fiber coating liquid on said coating layer,
wherein the secondary glass-fiber coating liquid is prepared in the form of an emulsion by dispersing a halogen-containing polymer (G) and a triazine compound (M) in an amount of M/G=0.3 to 10.0% by weight into an organic solvent; and
wherein the halogen-containing polymer (G) is present in an amount of 10.0 to 70.0% by weight based on the weight of the secondary coating layer.

19. The rubber-reinforcing glass fiber according to claim 18, wherein the triazine compound (M) is either triallyl cyanurate or triallyl isocyanurate.

20. A transmission belt in which the rubber-reinforcing glass fiber according to claim 18 is embedded in a base rubber material.

21. An automotive timing belt in which the rubber-reinforcing glass fiber according to claim 18 is embedded in a hydrogenated nitrile rubber.

22. A glass-fiber coating liquid for forming a coating layer on a glass fiber cord, the glass-fiber coating liquid being an emulsion consisting of:
a monohydroxybenzene-formaldehyde resin (A) obtained by reaction of monohydroxybenzene (D) and formaldehyde (E);
a vinylpyridine-styrene-butadiene copolymer (B);
a chlorosulfonated polyethylene (C);
at least one additive selected from the group consisting of an antioxidant, a pH adjuster and a stabilizer;
water; and
a styrene-butadiene copolymer (F) in an amount of F/B=5.0 to 80.0% by weight.

* * * * *